Aug. 13, 1957  W. S. BRINK  2,802,508
TRUCK RIM DESIGN
Filed Sept. 8, 1953   2 Sheets-Sheet 1
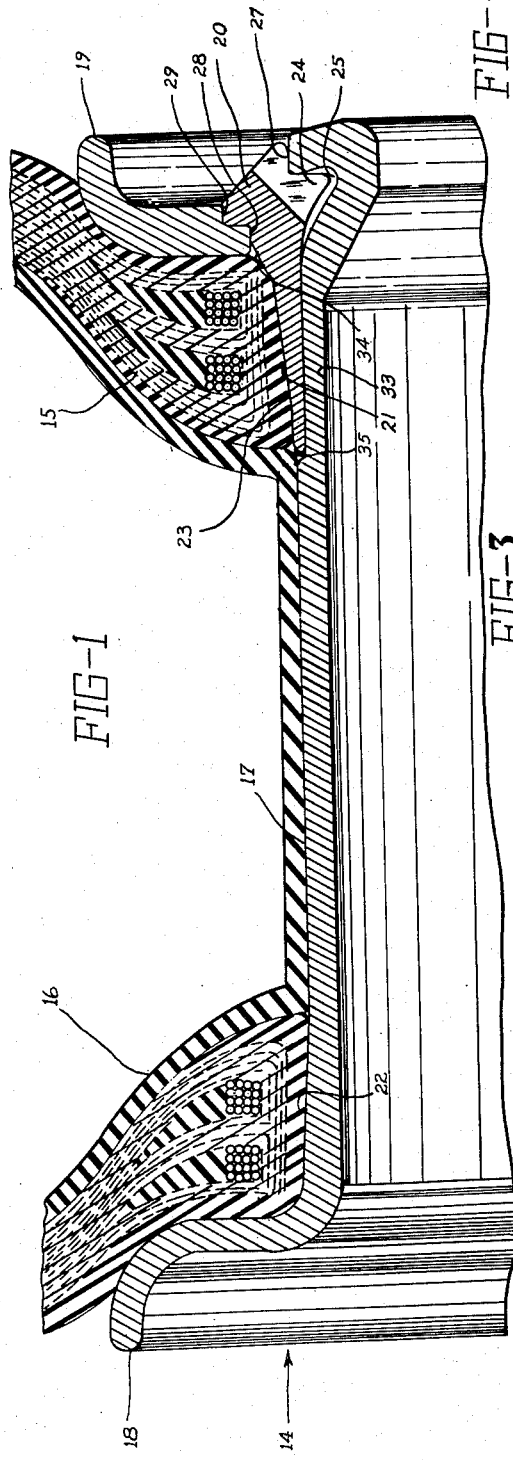
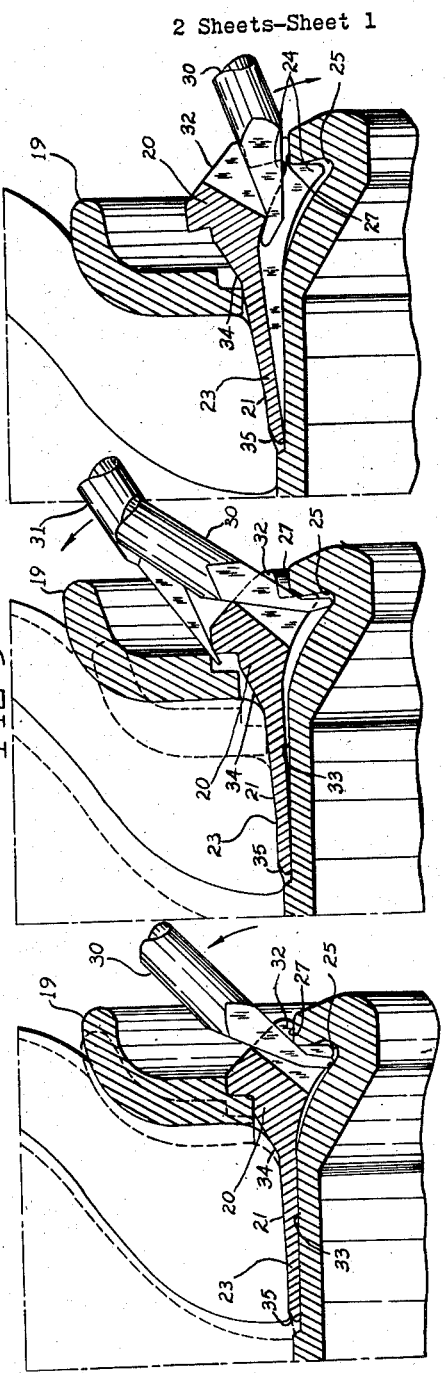
INVENTOR.
Winfield S. Brink
BY
W. A. Fraser Aug. 13, 1957 W. S. BRINK 2,802,508
TRUCK RIM DESIGN
Filed Sept. 8, 1953 2 Sheets-Sheet 2
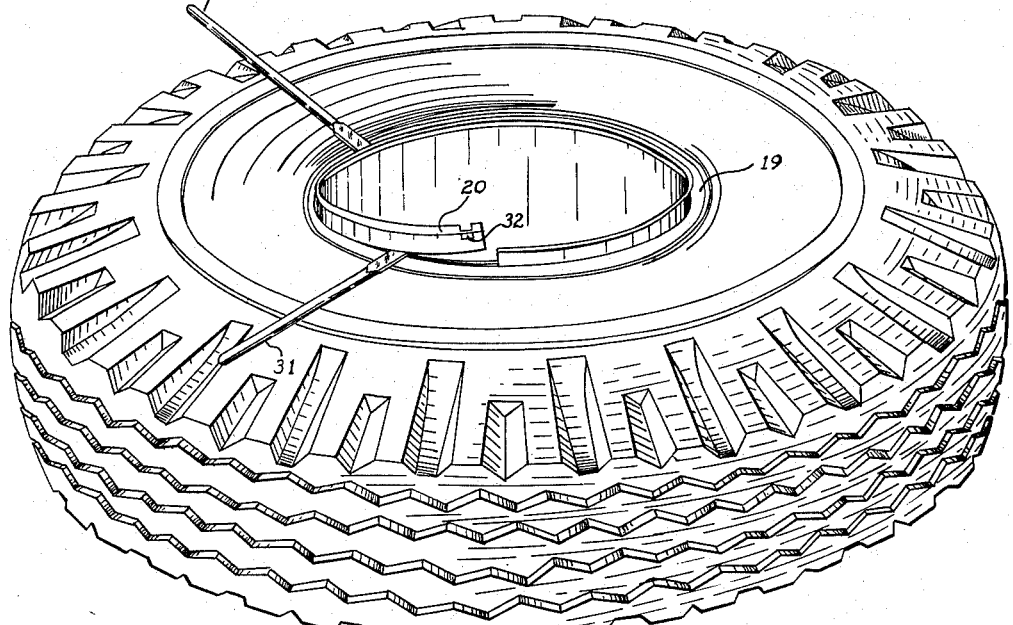
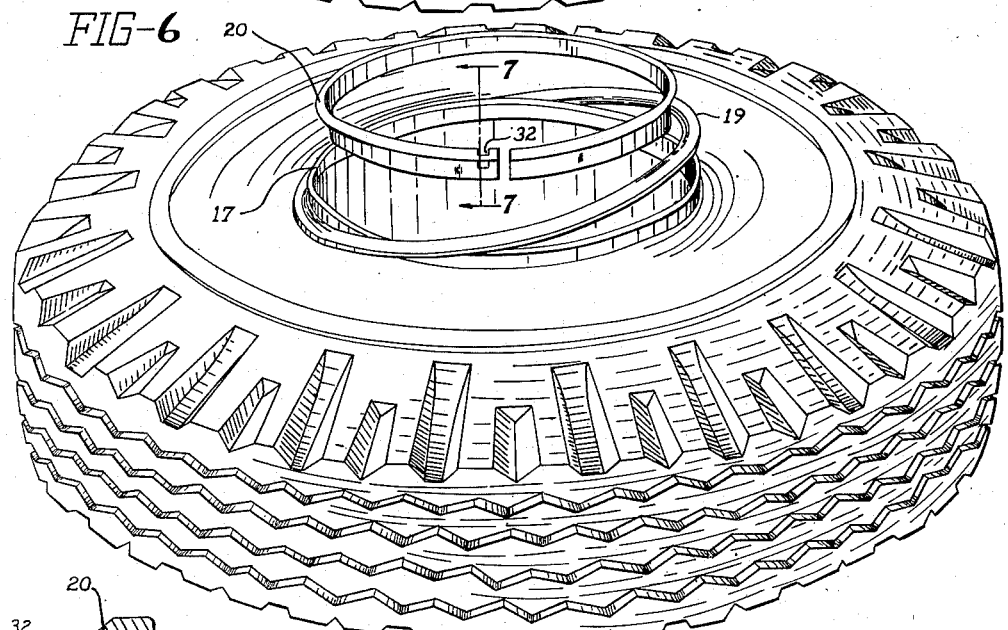
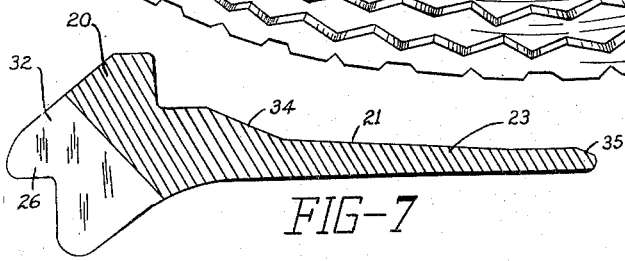
INVENTOR.
Winfield S. Brink
BY

United States Patent Office 2,802,508
Patented Aug. 13, 1957

2,802,508

TRUCK RIM DESIGN

Winfield S. Brink, Akron, Ohio, assignor to The Firestone Tire & Rubber Company, Akron, Ohio, a corporation of Ohio Application September 8, 1953, Serial No. 378,769

1 Claim. (Cl. 152—410)

This invention relates to tire rims for use with pneumatic tires, and more especially it relates to truck tire rims on which are mounted tires which in service are subjected to low-inflation pressure. This invention is an improvement over the rim structure shown in my U. S. Patent No. 2,537,624.

The reduction of the inflation pressure in truck tires to a very low pressure when a vehicle on which such tires are mounted is to run over sand banks, soft beach sand, soft soil or the like has become a common practice. By reduction of the inflation pressure a larger tire footprint is obtained which improves the flotation quality of the tires and makes possible the movement of trucks through mud, sand, snow, soft soil, etc. It has been found that truck tires may be run without injury to the tires at a much lower inflation pressure in soft soil than on a hard surface. Thus, for example, a 11.00–18 tire should be inflated to approximately 60# for hard road surface, but may be reduced to approximately 12# inflation pressure when it is run in soft sand. Military amphibian ship to shore vehicles often are equipped with dashboard control of the tire inflation pressure so that the pressure may be changed according to the terrain encountered. This adaptation of truck tires for use in soft soil by the expedient of low tire inflation pressure has become a common practice. However, as will be understood by those familiar with the art, low inflation pressure in a truck tire on present rims permits creeping of the tire on its rim. Such creeping damages the tire bead and often causes the tube valve to become ruptured resulting in a flat tire.

An object of the present invention is to provide a tire rim having a detachable raised bead seat in cooperation with a detachable rim side ring wherein a tire bead fits tightly on the raised bead seat, and said bead seat fits tightly on the tire rim whereby a truck tire may run with low inflation pressure without danger of the tire creeping on its rim.

Another object of the invention is to provide a tire rim so constructed that tire creeping is prevented and the inflation of the tire on the rim causes the components of the rim to seat without cocking and to be assembled concentrically in such manner as to prevent the tire or rim ring from being blown from the tire rim.

A further object is to provide a rim which facilitates the mounting and demounting of tires.

Other objects and advantages of the invention will be apparent from a consideration of the following detailed description.

In order that the said invention may be fully understood and readily carried into effect same will now be described with reference to the accompanying drawings, in which:

Figure 1 is a section taken on a line parallel to the radius of the wheel through the tire and rim.

Figures 2, 3, and 4 are views illustrating the relative positions of the various parts of the assembly during various stages of removing a tire from a rim embodying the present invention.

Figures 5 and 6 are perspective views showing further steps in the operation of demounting a tire.

Figure 7 is a sectional view of the wedge ring of the invention taken along line 7—7 of Figure 6.

As shown in Figure 1, the tire rim 14 on which tire 15 and inner tube 16 are mounted comprises a rim base 17, a peripheral, endless side flange 18 formed integrally with said base, and an endless, removable side flange 19 mounted upon a transversely split lock ring 20 which lock ring in turn is mounted upon the edge of said rim opposite said endless flange. The slopped portion 22 adjacent side flange 18 corresponds to the usual sloped portion of flat base truck rims. These sloped portions are for the purpose of increasing the diameter of the bead seat portion of the rim in order to provide a tight bead fit. Thus the portion 22 of the rim is frustoconical shape with its largest diameter adjacent to the flange 18. While a tight tire bead fit to its rim is desirable, it has been the common practice heretofore to taper only one bead seat of truck tire rims since no satisfactory way was known whereby the toe of the tire bead last mounted could be started over the peripheral edge of the sloped portion of the rim. Applicant's invention provides means for obtaining a tight bead seat fit on both bead seats of the tire by providing the transversely split detachable lock ring 20, Figure 1, with a tapered radial outward surface affording bead seat 21 on wedge portion 23 of lock ring 20 adapted to overlie the portion of the rim 14 opposite the flange 18. By reference to Figure 1 it will be seen that the lock ring 20 also has a radially inwardly projecting portion 24 which in the completed assembly shown in Figure 1 extends radially inwardly in a gutter or groove 25 of the rim 14. Said ring 20 also has an offset portion 26 which seats on a peripheral edge portion 27 of the rim 14 which edge portion 27 has a diameter no greater than the inside diameter of the beads of the tire 10. The ring 20 is additionally provided with means adapted to retain the tire flange 19 in operative position in service, this said means comprising a seat 28 formed by an axially-extending surface and a radially outwardly projecting surface. The seat is bounded at its axially outer end by a flange portion 29. It is to be noted that the flange portion 29 of the detachable locking ring is of substantially greater diameter than the tire bead seat; thus in operation a tire bead on said wedge portion 23 cannot pass over or blow off the locking ring 20. This feature is important as a safety factor since in mounting tires the flange 19 may sometimes be inadvertently omitted from the assembly in which case the person mounting the tire is protected against injury which would result from a truck tire blowing off a rim while being inflated. The flange 19 presents a continuous unbroken surface to the tire and accordingly no injury to the tire results as is the case where such flange has a transverse split. While the edge portion 29 of the split locking ring 20 has a diameter large enough to prevent a tire from blowing off the ring, yet the split in said locking ring does not contact the tire high enough above the tire bead to involve the extremely active part of the tire when the tire is being run in service. Thus it will be seen that tires run on applicant's rim will not be injured by the split in the locking ring.

The rim base is recessed at 33 to receive locking ring 20. It readily may be seen that the recess 33 allows the tapered portion 23 of locking ring 20 to be of substantial thickness. Substantial thickness of the tapered portion 23 of the ring 20 is necessary in some modifications of the invention for strength. The thick tapered portion of the locking ring does not remain above the rim base 17 to obstruct the tire bead during mounting of the tire but is hidden in the recess.

The locking ring 20 is provided with a tapered portion or coniform ramp 34 steeper than the angle of tapered seat 21, which guides the side ring 19 in an axially outward direction onto the seat 28, during mounting and inflation of the tire on the rim. Exerience has shown that the tapered portion 34 should make an angle with the rim base 17 of no greater than 30° and preferably not over 25°. A greater angle of taper makes it difficult for the side flange 19 to move up the tapered ramp 34 as the tire is inflated. It may be seen that if one side of the side ring 19 does not climb the tapered surface 34 to become seated on the locking ring, an unsatisfactory and even dangerous condition of incomplete mounting of the tire will result, with the side ring being subject to accidental blow-off.

With the tapered ramp portion 34 properly proportioned, as illustrated and described, the structure results in automatic seating of side ring 19 on its seat 28 during mounting and inflation of the tire on the rim, without any chance of accidental blow-off.

As above noted, the locking ring 20 is provided on the axial inner end with a tapered portion 35. The function of this tapered portion is to receive the tire bead as the tire is inflated, and to guide the bead up the taper of the locking ring and against the side ring 19. The tapered portion 35 cooperates with the recess in the rim base 17 and the ramp 34 to provide an improved rim.

The demounting of the tire 15 from rim 14 will now be described, reference being had to Figs. 2, 3, 4, 5 and 6. With the tire lying flat and the detachable locking ring 20 upward, the end of a tire iron or tool 30 is manually inserted in a slot 32 (Fig. 5) in the ring 20. Next the handle of the tool 30 is pressed downwardly away from the axis of the tire, thereby forcing locking ring 20, and flange ring 19 axially away from the groove 25 in the region adjacent slot 32. Next, two tire irons or tools 31 are employed to further force the rings 20, 19 and the tire bead laterally of the rim away from the groove 25, as will be understood by those familiar with demounting tires. The tire tools 31 are successively placed ahead of each other in the crack or opening between the edge of the rim 14 and the locking ring 20, whereby the said rings and tire bead progressively are forced axially toward the center of the rim. After said rings and tire bead have been moved a considerable distance as illustrated in Fig. 3, the next step is to separate the rings 20 and 19. This is accomplished by inserting the tool 30 in the slot 32 and holding the tool against the endless flange ring 19 while the tool 31 is forced between the rings 20 and 19 as illustrated in Fig. 3. By using the two tools 31 in similar fashion as just mentioned in working rings 20 and 19 away from the groove 25 the lock ring is worked back toward said groove away from the flange ring 19. When the ring 19 has been worked off the seat 28 the ring 19 may or may not drop into the position indicated by the dotted lines of Fig. 3; however, when the ring 19 has been removed from its seat on ring 20 the ring 19 becomes a floating ring whose position with relation to the rim 14 readily is changed. With the ring 19 unseated the split locking ring may be removed from the assembly and it is to be particularly noted that this removal may be done while the endless flange ring 19 is radially outward of the wedge shaped portion 23 of the locking ring 20. By reference to Fig. 4 it will be seen that the inside diameter of the ring 19 is large enough to enable the inside diameter of the projected portion 24 of the locking ring to pass over the peripheral edge portion 27 of the rim 14. Applicants have made possible this removal of the locking ring from under the endless flange ring by the relative diameters of the rim edge 27, Fig. 1, the inside and outside diameters of the portions 23, 24 and 29 of the ring 20, and the inside diameter of the flange ring 19. With one end of the locking ring raised out of position as shown in Fig. 5 the removed end may be grasped with a workman's hands and the ring 20 removed from the rim 14 after which the flange ring 19 is free to be removed as illustrated in Fig. 6. With rings 20 and 19 removed the tire and tube are readily removed from the rim 14 in an axial direction. However, it should be noted that applicant's arrangement and design of the assembly parts is such as to provide substantial clearance between the inside diameter of the tire beads by removing the wedge portions 23 from under one tire bead and by the other tire bead moving away from its tapered bead seat thus providing ample clearance between tire beads and rim for easy removal of the tire. It will now be seen that by making in possible to remove locking ring 20 without forcing the ring 19 beyond the toe 35 of the tapered portion 23 that the bead of the tire need only to be broken loose from its seat on the tapered portion 23 and moved a very short distance toward the center of the rim in order to demount the tire, the tire being passed laterally off the rim over the peripheral edge 27.

In mounting a tire on rim 14 a tire with its uninflated tube 16 is placed on the rim with one bead of the tire forced well onto the sloped portion 22. The other tire bead is then pressed over the rim to a point which will permit the application of the locking ring 20 which because of its split construction may be passed over the rim portion 27 and buttoned and locked into position. Before the lock ring 20 is buttoned in, the flange 19 is placed in position against the sides of the tire as will be understood by those familiar with the art. After said rings are in position, the tube 16 is gradually inflated causing the tire beads to move laterally outwardly one tire bead seating on the sloped portion 22 of the rim base 17 and the other on the sloped or wedge portion 23 of the ring 20. At the beginning of the said inflation the flange 19 is only approximately centered in respect to the flange seat 28 of the ring 20. However, as the flange 19 approaches its seat if it is not centered in respect thereto the flange will contact the sloping surface 34 of the locking ring 20 which acts as a centering means for said flange 19. As the inflation continues the flange 19 snaps into operative position after which the inflation is completed and the assembly is ready to be applied to a vehicle.

Modifications may be resorted to without departing from the spirit of the invention which therefore is to be limited only by the appended claim and the prior art.

What is claimed is:

A pneumatic tire rim having a substantially cylindrical rim base, a detachable endless side flange, and a transversely split bead-seating and rim locking ring, said ring having a tapered tire bead seat and a side flange mounting seat, and a side flange guiding portion contiguous with and intermediate said bead seat and said mounting seat, said flange guiding portion having a coniform radially outer surface which extends at an angle of not greater than 30° to the axis of the ring, said flange guiding portion terminating axially outwardly of the axially innermost surface of said endless flange, the angularity of said tapered bead seat with the axis of said ring being substantially less than the angularity of the coniform flange-guiding surface with said axis, the coniform flange guiding surface of the split locking ring extending radially outwardly to said side flange mounting seat, whereby the detachable side flange mounted over said locking ring will be forced by tire pressure over the conical guiding surface of said flange-guiding portion concentrically onto the side flange mounting seat without cocking, thereby preventing misalignment of the side flange.

References Cited in the file of this patent

UNITED STATES PATENTS

| 2,174,616 | Brink | Oct. 3, 1939 |
| 2,191,202 | Kranz | Feb. 20, 1940 |
| 2,537,624 | Brink | Jan. 9, 1951 |
| 2,563,748 | Riggs | Aug. 7, 1951 |
| 2,604,921 | Hale | July 29, 1952 |